US008087233B2

(12) United States Patent
Yokoi et al.

(10) Patent No.: US 8,087,233 B2
(45) Date of Patent: Jan. 3, 2012

(54) VEHICLE DIESEL ENGINE AND CONTROL METHOD OF THE SAME

(75) Inventors: Tatsuhisa Yokoi, Toyota (JP); Shigehiro Matsuno, Toyota (JP); Yasuo Harada, Toyota (JP); Ryouhei Kusunoki, Toyonaka (JP); Hidetomo Horikawa, Ibaraki (JP); Ryoichi Kitaoka, Ikeda (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 382 days.

(21) Appl. No.: 12/311,969

(22) PCT Filed: Nov. 6, 2007

(86) PCT No.: PCT/IB2007/003372
§ 371 (c)(1),
(2), (4) Date: May 8, 2009

(87) PCT Pub. No.: WO2008/056231
PCT Pub. Date: May 15, 2008

(65) Prior Publication Data
US 2010/0011745 A1   Jan. 21, 2010

(30) Foreign Application Priority Data

Nov. 9, 2006  (JP) ................................. 2006-304289

(51) Int. Cl.
*F01N 3/36* (2006.01)
(52) U.S. Cl. .......................................... 60/285; 60/277
(58) Field of Classification Search ..................... 60/285, 60/286, 295, 303, 277
See application file for complete search history.

(56) References Cited

U.S. PATENT DOCUMENTS

| 4,677,847 A * | 7/1987 | Sawatari et al. ............. 73/53.05 |
| 2005/0119821 A1 | 6/2005 | Malone et al. |
| 2005/0188685 A1 | 9/2005 | Folliot et al. |

FOREIGN PATENT DOCUMENTS

| EP | 1 361 354 A2 | 11/2003 |
| EP | 1 524 425 A1 | 4/2005 |
| EP | 1 568 872 A1 | 8/2005 |
| EP | 1 584 802 A2 | 10/2005 |
| JP | A-2003-120390 | 4/2003 |
| JP | A-2003-254138 | 9/2003 |
| JP | A-2005-048636 | 2/2005 |
| JP | A-2005-307778 | 11/2005 |
| JP | A-2006-002705 | 1/2006 |
| JP | A-2006-016988 | 1/2006 |
| JP | A-2006-029235 | 2/2006 |
| JP | A-2006-037925 | 2/2006 |
| JP | A-2006-046245 | 2/2006 |
| WO | WO 2006/056718 A1 | 6/2006 |

* cited by examiner

*Primary Examiner* — Thomas Denion
*Assistant Examiner* — Jonathan Matthias
(74) *Attorney, Agent, or Firm* — Oliff & Berridge, PLC

(57) ABSTRACT

A diesel engine includes: a PM filter provided in its exhaust passage; a fuel injection valve for performing post fuel injection in a cylinder of an engine body in addition to primary fuel injection, in order to supply fuel to the PM filter, to maintain its purification performance; an oil level sensor for detecting a degree of dilution of engine oil; and a first indicator lamp that is turned on to indicate that the engine oil needs to be changed when the degree of dilution of engine oil detected by the oil level sensor is equal to or greater than an allowable level. The vehicle diesel engine overrides the prohibition of the post fuel injection until a distance traveled by the vehicle after the indicator lamp is turned on reaches a predetermined distance.

8 Claims, 3 Drawing Sheets

VEHICLE DIESEL ENGINE AND CONTROL METHOD OF THE SAME

BACKGROUND OF THE INVENTION

1. Field of the Invention

The present invention relates to a vehicle diesel engine and a method of controlling the vehicle diesel engine.

2. Description of the Related Art

A vehicle diesel engine has a diesel particulate filter (DPF) in its exhaust passage to trap particulate matter (PM) contained in exhaust gas through the DPF in order to minimize exhaust emissions to the atmosphere. As the amount of PM deposits on such DPF increases, the filtering capability of the DPF decreases. Therefore, when the amount of PM deposits exceeds a predetermined amount, the DPM is heated to burn the PM deposits on the DPF to recover the filtering capability. The fuel injection valve supplies fuel to a combustion chamber of the engine through a primary fuel injection. Fuel may also be supplied through the fuel injection valve to a catalyst, such as an oxidation catalyst or an NOx storage reduction catalyst, provided in the exhaust passage upstream of the DPF, via a secondary fuel injection after the primary fuel injection. The secondary fuel injection is called post fuel injection. This allows the DPF to be heated by the heat generated through the oxidization of the fuel supplied to the catalyst.

However, the post-injected fuel is not burned in the combustion chamber. Thus, some of the fuel, which clings to the inner wall of the cylinder after being injected from the fuel injection valve, is mixed with engine oil in the oil pan located below the cylinder. Consequently, this dilutes the engine oil, which reduces engine oil lubrication performance. Thus, there arises a problem that the engine may seize up.

Some vehicle diesel engines are proposed in order to prevent the problem with the engine, such as seizing up due to the engine oil dilution. As described in Japanese Patent Application Publication No. 2005-307778 (JP-A-2005-307778), the vehicle diesel engine is designed to detect the degree of dilution of engine oil and alert a driver when the degree of dilution of engine oil is equal to or greater than an allowable degree at which an oil change is required, and simultaneously prohibit post fuel injection. This encourages the driver to change oil, while keeping the engine oil from becoming quickly diluted with fuel by prohibiting post fuel injection, and therefore, prevents the engine from seizing up.

The vehicle diesel engine has an exhaust gas purification device that alerts a driver when the degree of dilution of the oil exceeds an allowable maximum level, and simultaneously prohibits the above described post fuel injection. This ensures that the engine is prevented from seizing due to the oil dilution.

However, the driver may not always change oil immediately after the oil change alert is issued. Assuming that no oil change has been done for a prolonged period after the oil change alert or the prohibition of post fuel injection, the filtering capability of the DPF will not be regenerated during that period. During this period, the filtering capability is reduced significantly. Consequently, in addition to deterioration of the PM purification performance, another unavoidable problem arises, that is, increased exhaust resistance due to the clogging of the PM filter.

The post fuel injection is conducted sometimes for the purpose of preventing the temperature of the exhaust gas purification catalyst, such as oxidation catalytic converter and NOx catalytic converter for purifying NOx, from falling below the temperature at which the catalyst is active. The post fuel injection is also conducted sometimes for the purpose of supplying fuel as a reductant to reduce NOx. Therefore, the above problems are shared not only with PM filters for trapping PM, but also with general exhaust gas purification devices including the oxidation catalytic converter and the NOx catalytic converter.

SUMMARY OF THE INVENTION

The present invention provides a vehicle diesel engine that suppresses a reduction in purification capability of an exhaust gas purification device due to prohibition of secondary fuel injection and that allows a vehicle to travel to a location for an oil change, and provides a method of controlling the diesel engine.

A first aspect of the present invention is directed to a vehicle diesel engine including: an exhaust gas purification device provided in an exhaust passage of the vehicle diesel engine; secondary fuel injection means for performing secondary fuel injection in a cylinder of the engine, in addition to primary fuel injection, in order to supply fuel to the exhaust gas purification device to maintain the purification performance of the exhaust gas purification device; oil dilution degree detecting means for detecting degree of dilution of engine oil; indicating means for notifying an occupant of the vehicle that the engine oil needs to be changed when the degree of dilution of engine oil detected by the oil dilution degree detecting means is equal to or greater than an allowable degree at which an oil change is required; and prohibition means for prohibiting the secondary fuel injection means from executing the secondary fuel injection, provided the alerting means issues the alert, in which the vehicle diesel engine further has override means for maintaining the override of the prohibition of the secondary fuel injection, implemented by the prohibition means, until a predetermined time period has elapsed after the indicating means has been turned ON.

The above feature of the invention allows the vehicle to continue traveling, with the secondary fuel injection implemented, for a predetermined time period from when the oil change indicator is turned on to when an oil change is actually performed. Consequently, unlike the conventional configuration in which the secondary fuel injection is prohibited immediately after the oil change alert is issued, a reduction in purification capability of the exhaust gas purification device due to the prohibition of the secondary fuel injection is suppressed, while the vehicle is allowed to run to a location for an oil change.

The override means may define a period from when the oil change alert is issued to when the distance that the vehicle has traveled reaches a predetermined distance as the certain period.

The above feature of the invention allows the override of the prohibition of the secondary fuel injection to be maintained until the distance that the vehicle has traveled since the alert reaches a predetermined distance. This further ensures that the vehicle runs to the location for an oil change, while suppressing a reduction in purification performance of the exhaust gas purification device.

In addition, the indicating means may change indicating modes of the alert to encourage an occupant of the vehicle to change oil when the override of the prohibition of the secondary fuel injection is terminated after the predetermined period has elapsed after the indicating means was turned on.

The above feature of the invention allows an occupant of the vehicle to be notified that the need for an oil change is urgent.

In addition, the vehicle diesel engine may further include: determination means for determining whether the purification performance of the exhaust gas purification device is below a predetermined value after the override of the prohibition of the secondary fuel injection is terminated; and fuel injection amount decreasing means for decreasing an amount of fuel to be injected, the amount depending on displacement of an acceleration pedal, provided the determination means determines that the purification performance of the exhaust gas purification device is below a predetermined value.

According to the above feature of the invention, the amount of fuel to be injected is decreased if the purification performance of the exhaust gas purification device is below a predetermined value due to the prohibition of the secondary fuel injection. This reduces the amount of particles to be purified, the particles being contained in exhaust gas, and therefore, minimizes emissions of the particles through the exhaust gas purification device, whose purification performance is below a predetermined value, to the atmosphere. In addition, the engine output is forcibly lowered by decreasing the amount of fuel to be injected, which depends on the displacement of the acceleration pedal. This allows an occupant of the vehicle to be informed of the need for an oil change as high-emergency information, which encourages the occupant to perform an oil change.

According to the first aspect of the invention, the determination means of the vehicle diesel engine determines whether the purification performance of the exhaust gas purification device is below a predetermined value after the override of the prohibition of the secondary fuel injection, which has been implemented by the override means, is terminated. When the determination means determines that the purification performance of the exhaust gas purification device is below a predetermined value, the indicating means may indicate that the exhaust gas purification device is malfunctioning using a different indicating mode from the indicating mode used for indicating the oil change alert.

Further, when the determination means determines that the purification performance of the exhaust gas purification device is below a predetermined value, the indicating means may indicate that the exhaust gas purification device is malfunctioning using a different indicating mode from the indicating mode used for indicating the oil change alert.

An occupant of the vehicle is thus notified that the purification performance of the exhaust gas purification device is below a predetermined value. This informs the occupant that the need to change the oil is urgent, thereby encouraging the occupant to perform an oil change.

Still further, the exhaust gas purification device may be a PM filter that traps PM contained in exhaust gas, and that burns and removes the PM trapped by the PM filter using fuel provided via the secondary fuel injection of the secondary fuel injection means.

The engine having the PM filter in its exhaust system needs to perform the secondary fuel injection frequently enough to burn and remove the PM trapped by the PM filter. Therefore, such engine tends to suffer from the disadvantage due to the oil dilution. However, employing the configuration described in the first aspect of the invention in the engine provided with the aforementioned PM filter suppresses a reduction in PM purification performance of the PM filter due to the prohibition of the secondary fuel injection, while allowing the vehicle to travel to the location for an oil change.

A second aspect of the present invention is directed to a control method for a vehicle diesel engine that includes an exhaust gas purification device provided in an exhaust passage. The control method includes: detecting the degree of dilution of engine oil; notifying an occupant of the vehicle that the oil needs to be changed if the degree of dilution of engine oil is equal to or greater than an allowable degree at which an oil change is required; and provided that the alert is issued, performing secondary fuel injection in a cylinder of the engine in addition to primary fuel injection after a lapse of a certain period since the alert, in order to supply fuel to the exhaust gas purification device, thereby maintaining purification performance of the exhaust gas purification device.

The above control method allows the vehicle to continue traveling, with the secondary fuel injection effected, for a period from when the oil change alert is issued to when an oil change is actually performed. Consequently, unlike the conventional control method, in which the secondary fuel injection is prohibited immediately after the oil change alert is issued, a decrease in purification capability of the exhaust gas purification device due to the prohibition of secondary fuel injection is suppressed, while the vehicle is allowed to run to a location for an oil change.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
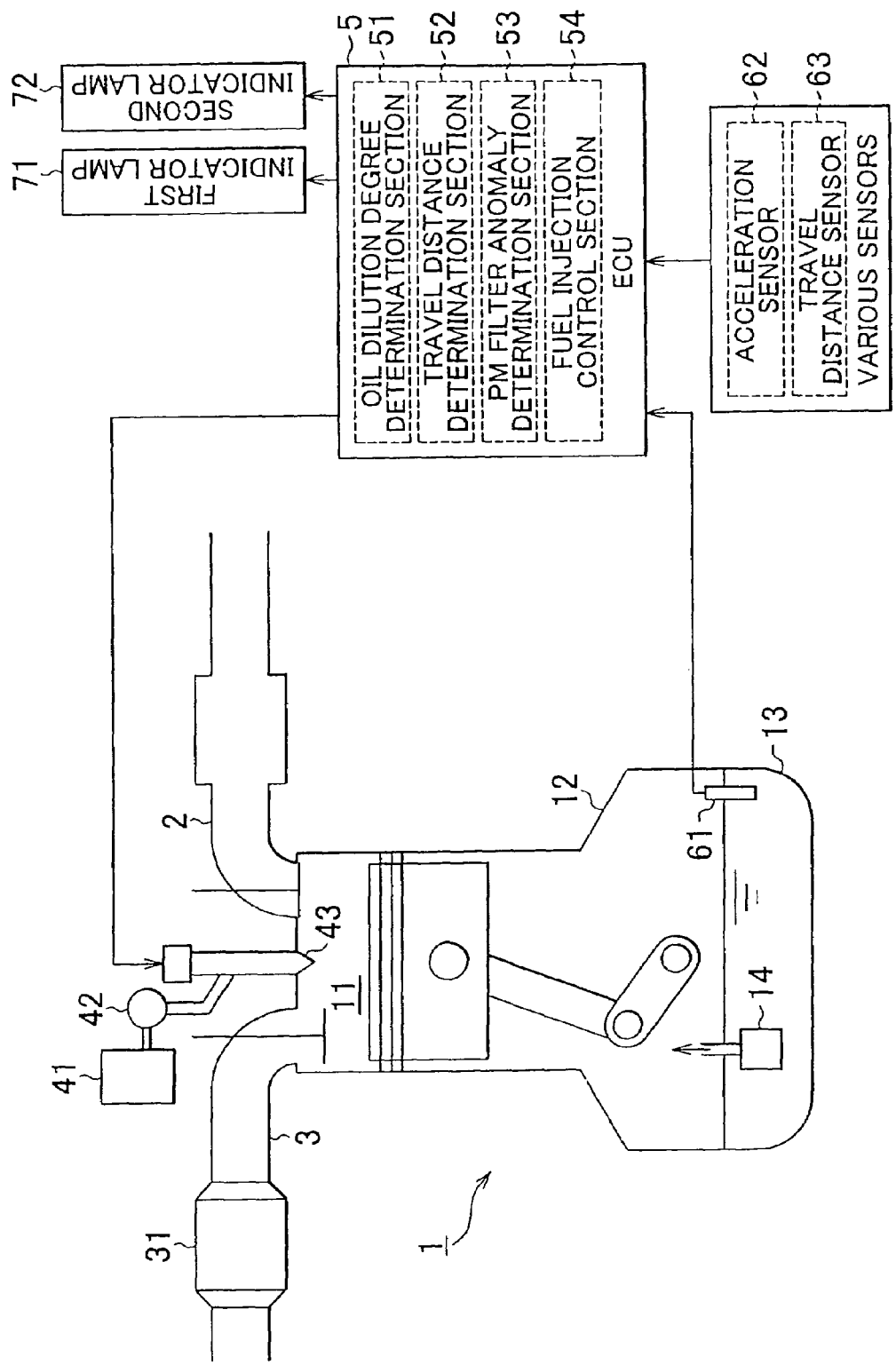
FIG. 1 is a block diagram illustrating the overall configuration of a vehicle diesel engine and a control system of the vehicle diesel engine according to one embodiment of the invention.

A vehicle diesel engine according to one embodiment of the present invention will be hereinafter described with reference to FIGS. 1 to 3. FIG. 1 is a block diagram illustrating an overall configuration of the vehicle diesel engine and a control system of the vehicle diesel engine.

As shown in FIG. 1, the vehicle diesel engine includes an engine body 1, an intake passage 2, and an exhaust passage 3 as major components. The engine body 1 includes a cylinder block and a cylinder head. An inner space of the cylinder block defines a combustion chamber 11. The engine body 1 also includes a crankcase 12 and an oil pan 13. The crankcase 12 is designed to accommodate an engine output shaft or a crankshaft. The oil pan 13 is designed to reserve engine oil. An oil pump 14 is provided in the oil pan 13. Oil, reserved in the oil pan 13, is delivered from the oil pump 14 to sliding parts of the engine, such as an inner peripheral surface of the combustion chamber 11. The oil, which has been already used for lubricating the sliding parts of the engine, flows back to the oil pan 13 and is reserved therein. The cylinder head is provided with a common rail 42 and a fuel injection valve 43. The common rail 42 is designed to reserve high-pressure fuel delivered by a supply pump 41. The fuel injection valve 43 is designed to directly inject fuel reserved in the common rail 42 to the combustion chamber 11.

The intake passage 2 and the exhaust passage 3 are connected to the engine body 1. The intake passage 2 is designed to supply air into the combustion chamber 11. The exhaust passage 3 is designed to emit exhaust gas produced in the combustion chamber 11 to the atmosphere. The exhaust passage 3 is provided with a ceramic PM filter 31. The PM filter 31 is designed to trap PM contained in exhaust gas when the PM passes through the PM filter 31. However, as described above, the PM filter 31 has a lower filtering capability as the amount of PM deposits increases. Therefore, fuel is added to the exhaust gas by the fuel injection valve 43 to burn and remove the PM trapped by the PM filter 31 in order to recover the filtering capability of the PM filter 31.

The diesel engine also includes a rotational speed sensor, a coolant temperature sensor, and an oil level sensor 61. The rotational speed sensor detects the rotational speed of the crankshaft. The coolant temperature sensor detects the temperature of the coolant in the engine. The oil level sensor 61 detects the oil level in the oil pan 13. In turn, a vehicle, equipped with the diesel engine, is provided with an acceleration sensor 62, a travel distance sensor 63, and so forth. The acceleration sensor 62 detects the displacement of an acceleration pedal. The travel distance sensor 63 detects the distance the vehicle has traveled. Results of the detection by these sensors are output to an electronic control unit (ECU) 5.

A first indicator lamp 71 and a second indicator lamp 72 are provided on an instrumental panel in the vehicle interior. The first indicator lamp 71 indicates that the oil should be changed. The second indicator lamp 72 indicates that there is a malfunction with the PM filter 31. The ECU 5 controls both the first indicator lamp 71 and the second indicator lamp 72.

The ECU 5 includes, as major sections, an oil dilution degree determination section 51, a travel distance determination section 52, a PM filter malfunction determination section 53, and a fuel injection control section 54. The fuel injection control section 54 knows engine operating conditions based on detection signals input from the respective sensors, and controls opening of the fuel injection valve 43 or performs fuel injection control based on the engine operating conditions. More specifically, under the fuel injection control, fuel injection is not only performed as primary fuel injection, in which fuel is injected near compression top dead center, but also performed following the primary fuel injection, or so-called post fuel injection, in which fuel is injected to add the fuel to exhaust gas during a period from the end of the expansion stroke to throughout the exhaust stroke. The aforementioned configuration to perform the post fuel injection may be regarded as secondary fuel injection means.

The oil dilution degree determination section 51 compares the oil level detected by the oil level sensor 61 with a preset allowable maximum oil level in order to determine whether the oil dilution degree is equal to or greater than an allowable degree, over which the oil should be changed.

Based upon the determination made by the oil dilution degree determination section 51 that there is a need to notify an occupant of the vehicle that the oil should be changed, the first indicator lamp 71 is turned ON. Then, the travel distance determination section 52 determines the distance that the vehicle has traveled since the first indicator lamp 71 was turned ON. Then, the travel distance determination section 52 determines whether or not the travel distance thus detected reaches a predetermined distance.

The PM filter malfunction determination section 53 functions as the means for determining whether the purification capacity of the PM filter 31 is below a predetermined value after the prohibition of post injection is implemented. FIG. 2 is a flowchart illustrating a specific procedure of the steps in order to notify an occupant of the vehicle that the oil needs to be changed and to prohibit post fuel injection, which is executed by the ECU 5. A series of the steps are repeated by the ECU 5 at predetermined intervals.

Figure 2:
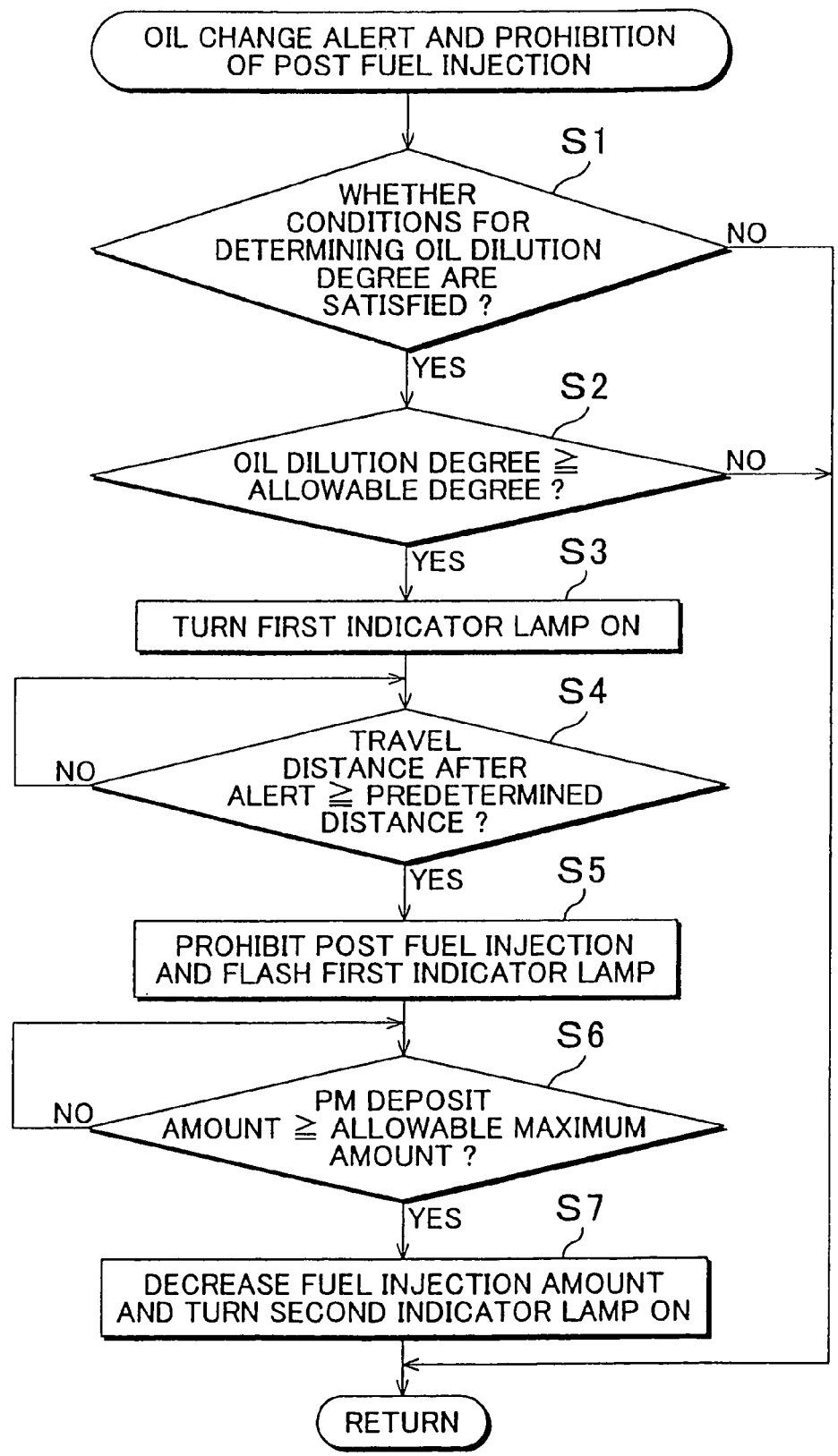
FIG. 2 is a flowchart illustrating the steps in the procedure, whereby an occupant of the vehicle is advised to change the oil and the execution of the post fuel injection is prohibited, that is executed by the control system of the vehicle diesel engine according to the embodiment of the invention.

As shown in FIG. 2, in the series of the steps, whether the conditions for determining the oil dilution degree are satisfied are determined as the first step S1. In the embodiment of the invention, the above-described conditions for determining the oil dilution degree are satisfied are that: for example, the temperature of the coolant is below a predetermined temperature; and the engine rotational speed continues to fall within a predetermined rotational speed range for a certain period. If the determination result shows that the conditions for determining the oil dilution degree are satisfied ("YES" in the step S1), the operation proceeds to the next step S2 to determine whether the oil dilution degree is equal to or greater than an allowable degree at which an oil change is required. If the determination result shows that the oil dilution degree is equal to or greater than an allowable degree ("YES" in the step S2), the procedure goes to the next step S3 to turn the first indicator lamp 71 ON.

In contrast, if the conditions for determining the oil dilution degree are not satisfied ("NO" in the step S1), or if the oil dilution degree is below an allowable degree at which an oil change is required ("NO" in the step S2) although the conditions for determining the oil dilution degree are satisfied, the operation ends temporarily.

When the first indicator lamp 71 is turned ON, the operation proceeds to the next step S4 to determine whether the distance the vehicle has traveled since the first indicator lamp 71 was turned ON is equal to or greater than a predetermined distance. If the determination result shows that the distance that the vehicle has traveled since the first indicator lamp 71 was turned ON is equal to or greater than a predetermined distance ("YES" in the step S4), the operation proceeds to the next step S5 to prohibit post fuel injection and simultaneously switch the alerting mode of the first indicator lamp 71 from lighting mode to flashing mode.

In contrast, if the distance that the vehicle has traveled since the first indicator lamp 71 was turned ON is below a predetermined distance ("NO" in the step S4), the step S4 is repeated until the distance that the vehicle has traveled is equal to or greater than a predetermined distance. In other words, the prohibition of post fuel injection is kept invalidated until the distance the vehicle has traveled since the first indicator lamp 71 was turned ON is equal to or greater than a predetermined distance.

Then, when the alerting mode of the first indicator lamp 71 is switched to the flashing mode concurrently with prohibition of the post fuel injection, the operation proceeds to the next step S6 to determine whether the amount of PM deposits on the PM filter 31 is equal to or greater than an allowable maximum amount. In the embodiment of the invention, a differential pressure in the PM filter 31 is detected between the upstream side of the exhaust passage and the downstream side of the exhaust passage. If the differential pressure exceeds a preset certain value, the amount of PM deposits is determined to be equal to or greater than an allowable maximum amount, in other words, it is determined that there is a malfunction with the PM filter 31. Also, post fuel injection intended to burn and remove PM trapped by the PM filter 31 is performed provided the amount of PM deposits is equal to or greater than a specified amount. Here, the above-described allowable maximum amount is preset larger than the specified amount of PM deposits as a condition for performing post fuel injection. If the determination result shows that the current amount of PM deposits is equal to or greater than an allowable maximum amount ("YES" in the step S6), the operation proceeds to the next step S7 to decrease the amount of fuel to be injected and simultaneously turn the second indicator lamp 72 ON. In order to decrease the amount of fuel to be injected, a command value is set such that the amount of fuel to be actually injected by the fuel injection valve 43 is decreased from the amount of fuel to be injected, which depends on the engine operation conditions including the displacement of the acceleration pedal by the driver. The above-described configuration to decrease the fuel injection amount may be regarded as fuel injection amount decreasing means.

In contrast, if the amount of PM deposits is below an allowable maximum amount ("NO" in the step S6), the step S6 is repeated until the amount of PM deposits is equal to or greater than an allowable maximum amount.

When the second indicator lamp 72 is turned ON, the procedure ends temporarily. Next, with reference to the timing chart in FIG. 3, the timing at which operating mode of the each indicator lamp 71 and 72 are changed, as well as the timing at which the fuel injection amount is decreased, when the series of the steps shown in FIG. 2 are executed, will be described.

Figure 3:
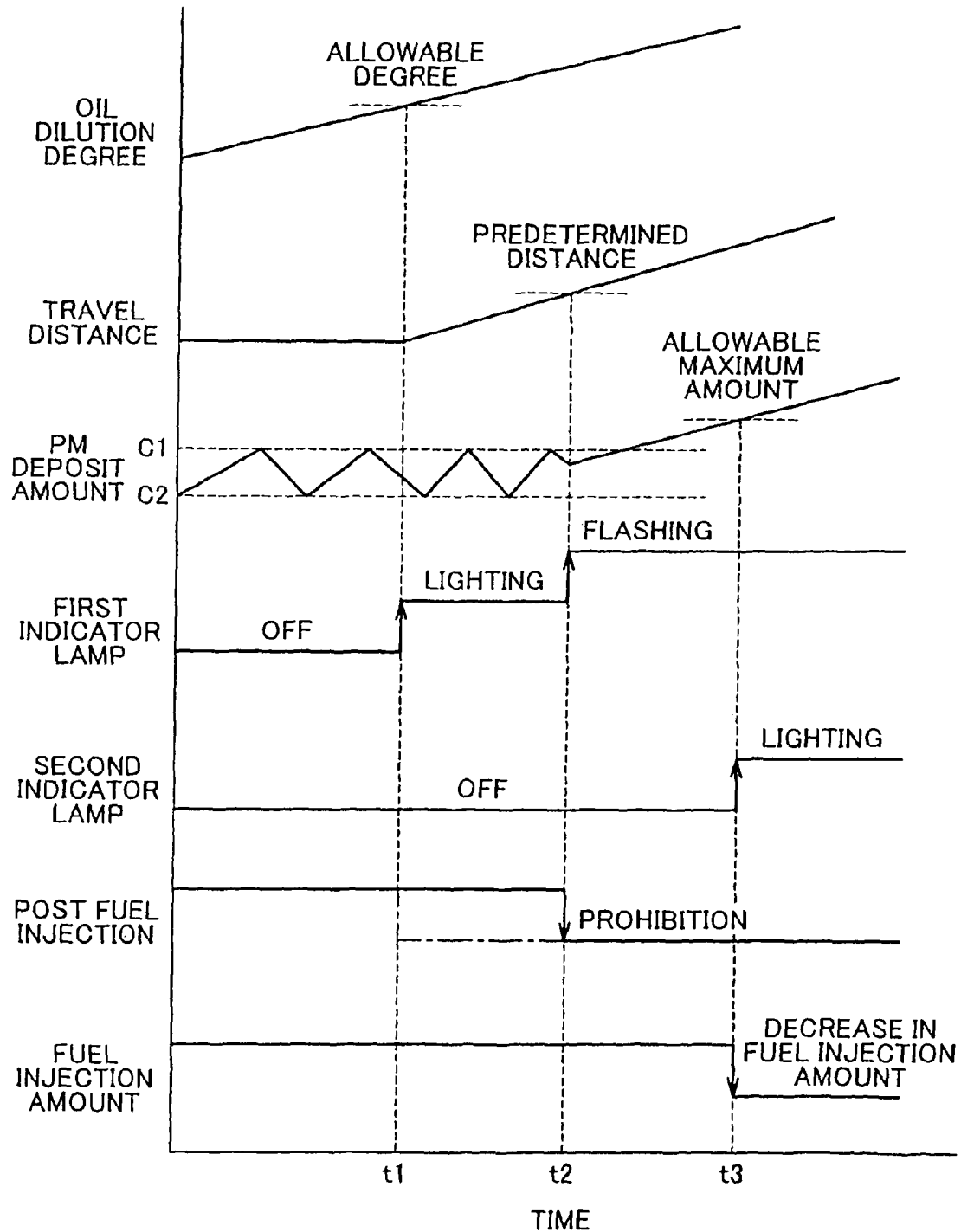
FIG. 3 is a timing chart, showing respective timings at which indicator lamps individually change their operating modes, at which the amount of fuel to be injected is decreased, and the like, after an alert to an oil change is issued and post fuel injection is prohibited.

As shown in FIG. 3, at time t1, when the oil dilution degree is equal to or greater than an allowable degree, the first indicator lamp 71 is turned ON, while the distance that the vehicle has traveled since the first indicator lamp 71 is turned ON is monitored. Even when the oil dilution degree is equal to or greater than an allowable degree, the execution of the post fuel injection is not prohibited. Thus, if the condition for executing post fuel injection is satisfied, in other words, if the amount of PM deposits on the PM filter 31 exceeds a predetermined amount C1, post fuel injection is performed as usual. If the amount of PM deposits on the PM filter 31 is below a predetermined amount C2 that is smaller than the predetermined amount C1, post fuel injection is discontinued because the PM filter 31 no longer needs to be regenerated. After that, at the time t2, when the distance that the vehicle has traveled reaches a predetermined distance, the first indicator lamp 71 is switched from lighting mode to flashing mode, and afterwards, the execution of the post fuel injection is prohibited. As described above, under the control in accordance with the embodiment of the invention, even if the oil dilution degree is equal to or greater than an allowable degree, the execution of the post fuel injection is not immediately prohibited as indicated by the chain double-dashed line in FIG. 3. The override of the prohibition of post fuel injection is maintained until the distance the vehicle has traveled reaches a predetermined distance. Further, at the time t3, when the amount of PM deposits reaches an allowable maximum amount, the second indicator lamp 72 is turned ON, and the amount of fuel to be injected after the turning-ON of the second indicator lamp 72 is decreased to forcibly reduce the engine output.

The vehicle diesel engine according to the aforementioned embodiment of the invention provides the following effects.
(1) The override of the prohibition of post fuel injection is maintained until the distance that the vehicle has traveled since the first indicator lamp 71 was turned ON reaches a predetermined distance. This allows the vehicle to continue traveling, with post fuel injection effected, for a period after the oil change alert is issued to when an oil change is actually performed. Consequently, unlike the conventional configuration in which post fuel injection is prohibited immediately after the oil change indication is issued, a reduction in purification capability of the PM filter 31 due to the prohibition of post fuel injection is suppressed. Also, it is possible to further ensure that the vehicle is able to reach the location for an oil change.

(2) When the distance that the vehicle has traveled since the first indicator lamp 71 was turned ON reaches a predetermined distance, and the override of the prohibition of post fuel injection is terminated, then the indicating mode of the first indicator lamp 71 is switched from lighting mode to flashing mode. This notifies the occupant of the vehicle that the need to change the oil is urgent.

(3) After the override of the prohibition of post fuel injection is terminated, whether the purification performance of the PM filter 31 is below a predetermined value is determined. Then, provided that the purification performance of the PM filter 31 is determined to be lower than a predetermined value, the amount of fuel to be injected, which depends on the displacement of the acceleration pedal, is decreased. Therefore, when the purification performance of the PM filter 31 is below a predetermined value due to the prohibition of post fuel injection, the amount of fuel to be injected is decreased. This reduces the amount of PM contained in exhaust gas, and therefore, minimizes the PM emissions through the PM filter 31, whose purification performance is below a predetermined value, to the atmosphere. In addition, the engine output is forcibly reduced by decreasing the amount of fuel to be injected, which depends on the displacement of the acceleration pedal. This allows an occupant of the vehicle to be informed of the need for an oil change as high-emergency information, which encourages the occupant to perform an oil change.

(4) When the purification performance of the PM filter is determined to be below a predetermined value, the second indicator lamp 72, separate from the first indicator lamp 71 designed to encourage to change oil, is turned ON to indicate that there is a malfunction with the PM filter 31. An occupant of the vehicle is thus notified that the purification performance of the PM filter 31 is below a predetermined value. This makes the occupant of the vehicle recognize how urgently the oil needs to be changed, thereby encouraging the occupant to perform an oil change.

The vehicle diesel engine of the invention is not limited to the configuration exemplified in the above embodiment, but may also be modified to other configurations as appropriate, which will be discussed below.

The indication modes of the first indicator lamp 71 and the second indicator lamp 72 are not limited to the modes exemplified in the aforementioned embodiment. Alternatively, other indicating modes may be employed, such as an audio alert and a visual alert on the display screen of the navigation system.

As exemplified in the aforementioned embodiment, post fuel injection is performed as the secondary fuel injection during a period from the end of the expansion stroke to throughout the exhaust stroke. The period for which the secondary fuel injection is performed is not limited to that. Alternatively, the secondary fuel injection may be performed during a period between the primary fuel injection and the post fuel injection, in other words, during a period from near compression top dead center to the end of the expansion stroke.

In the aforementioned embodiment of the invention, the allowable maximum amount is predetermined as a condition for determining if the purification performance of the PM filter 31 is below the predetermined value after the prohibition of the secondary fuel injection is validated. This predetermined allowable maximum amount is larger than the amount of PM deposits as the condition for performing post fuel injection. Alternatively, the allowable maximum amount may be preset equal to the amount of PM deposits as the condition for performing post fuel injection.

As described above, when the purification performance of the PM filter 31 is determined to be lower than a predetermined value, the amount of fuel to be injected in accordance with the displacement of the acceleration pedal is decreased. Such manipulation to decrease the amount of fuel to be injected is desirable to reduce the amount of PM contained in exhaust gas, and therefore, results in a reduction in PM emissions through the PM filter 31 whose purification performance is below a predetermined value. However, the manipulation to decrease the amount of fuel to be injected is not always necessary, if at least the override of the prohibition of the secondary fuel injection is maintained until the distance that the vehicle has traveled since the alert issued by the first indicator lamp 71 reaches a predetermined distance. The override suppresses a reduction in purification performance of the PM filter 31 due to the prohibition of the secondary fuel injection, while allowing the vehicle to reach a location for an oil change.

In the above-described embodiment, when the PM filter malfunction determination section 53 determines that the purification performance of the PM filter 31 is below a predetermined value, the second indicator lamp 72 is turned ON to indicate that there is a malfunction with the PM filter 31. However, the second indicator lamp 72 may be omitted if an alternative way to indicate that there is a malfunction with the PM filter 31 is used.

As described above, an occupant of the vehicle may be notified of the urgent need to change the oil by switching the indicating mode of the first indicator lamp 71 from lighting mode to flashing mode, when the distance that the vehicle has traveled since the first indicator lamp 71 was turned ON reaches a predetermined value, and then the override of the prohibition of the secondary fuel injection is terminated. However, it should be understood that the occupant of the vehicle may also be informed of the need for an oil change by keeping the first indicator lamp 71 ON, instead of by changing the alerting modes of the first indicator lamp 71 in the manner as described.

In the embodiment of the invention, the time period, during which the secondary fuel injection prohibition override is maintained after the first indicator lamp 71 issued an alert, is decided based the distance the vehicle has traveled. Alternatively, this period may be decided based on the elapsed time following the notification, the duration of the engine operation following the notification, the number of times of the secondary fuel injection done following the notification, the amount of fuel to be injected following the notification, or the like. In short, the vehicle diesel engine may be provided with any override means, as long as the override means continue to override the prohibition of the secondary fuel injection, which is implemented by the prohibition means, until a prescribed time has elapsed after the alert means issues an alert.

The embodiment of the invention shows an example in which the exhaust gas purification catalyst in the vehicle diesel engine of the invention is applied to the PM filter 31. It should be noted that it is critical for such PM filter 31 to serve as the exhaust gas purification catalyst to maintain the amount of PM deposits at or below an appropriate amount. Moreover, there is a serious problem with the purification capability of the PM filter 31, as previously mentioned, that the purification capability is reduced if the secondary fuel injection is prohibited. In this respect, applying the aforementioned exhaust gas purification catalyst to the PM filter 31 takes full advantage of the effects of the invention to provide the maximum improvements of the purification capability of the PM filter 31. However, the exhaust gas purification device in the vehicle diesel engine of the invention is not limited to that. Alternatively, the invention may be applicable to a NOx catalyst, an oxidation catalyst and other catalysts, if at least the secondary fuel injection is provided to the catalyst for reducing NOx, removing SOx, or maintaining the catalyst temperature. In short, the invention is applicable to any exhaust gas purification device provided in the exhaust passage of the diesel engine, in which the purification capability may be reduced. The point is that the invention is applicable to any exhaust gas purification device provided in the exhaust passage of the diesel engine, as long as the purification capability of the exhaust gas purification device can drop due to the prohibition of the secondary fuel injection.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A vehicle diesel engine exhaust gas purification system comprising:
   an exhaust gas purification device provided in an exhaust passage of a diesel engine;
   a secondary fuel injection device for performing secondary fuel injection in a cylinder of the engine after a primary fuel injection, to supply fuel to the exhaust gas purification device and thereby maintain purification performance of the exhaust gas purification device;
   a control unit configured to detect a degree of dilution of engine oil of the diesel engine;
   an indicator coupled to the control unit and that indicates to an occupant of the vehicle that the engine oil needs to be changed when the control unit detects that the degree of dilution of the engine oil is equal to or greater than an allowable degree;
   wherein the control unit also is configured to control the secondary fuel injection device to (i) prohibit execution of the secondary fuel injection when the indicator indicates that the engine oil needs to be changed, and (ii) override the prohibition of the execution of the secondary fuel injection until a prescribed period has elapsed after the indicator indicates that the engine oil needs to be changed.

2. The vehicle diesel engine exhaust gas purification system according to claim 1, wherein
   the control unit is configured to define a period from when the indicator indicates that the engine oil needs to be changed to when the vehicle has traveled a predetermined distance as the prescribed period.

3. The vehicle diesel engine exhaust gas purification system according to claim 1, wherein
   the indicator changes indicating modes when the override of the prohibition of the secondary fuel injection is terminated after the prescribed period has elapsed after the indicator indicates that the engine oil needs to be changed.

4. The vehicle diesel engine exhaust gas purification system according to claim 1, wherein the control unit is configured to determine whether a purification performance of the exhaust gas purification device is below a predetermined value after the override of the secondary fuel injection is terminated; and decrease an amount of fuel injected during the primary fuel injection, in accordance with a displacement of an acceleration pedal, when it has been determined that the purification performance of the exhaust gas purification device is below the predetermined value.

5. The vehicle diesel engine exhaust gas purification system according to claim 1, wherein the control unit is configured to determine whether a purification performance of the exhaust gas purification device is below a predetermined value after the override of the prohibition of the secondary fuel injection is terminated, and when it has been determined that the purification performance of the exhaust gas purification device is below the predetermined value, the control unit is configured to cause the indicator to indicate that the exhaust gas purification device is malfunctioning using a different indicating mode than the indicating mode used to indicate that the oil needs to be changed.

6. The vehicle diesel engine exhaust gas purification system according to claim 4, wherein when it has been determined that the purification performance of the exhaust gas purification device is below the predetermined value, the indicator indicates that the exhaust gas purification device is malfunctioning using a different indicating mode than the indicating mode used to indicate that the oil needs to be changed.

7. The vehicle diesel engine exhaust gas purification system according to claim 1, wherein the exhaust gas purification device is a PM filter that traps PM contained in the exhaust gas, and burns and removes the PM trapped by the PM filter using fuel provided by the secondary fuel injection of the secondary fuel injection device, and the control unit is configured to determine whether an amount of PM deposited on the PM filter is equal to or greater than an allowable maximum amount.

8. A control method for a vehicle diesel engine that includes an exhaust gas purification device provided in an exhaust passage, the method comprising:

performing secondary fuel injection in a cylinder of the engine, after a primary fuel injection, in order to supply fuel to the exhaust gas purification device and thereby maintain purification performance of the exhaust gas purification device;

detecting a degree of dilution of engine oil of the vehicle diesel engine;

indicating to an occupant of the vehicle that the engine oil needs to be changed if the degree of dilution of the engine oil is equal to or greater than an allowable degree;

when it is indicated that the oil needs to be changed, prohibiting the secondary fuel injection; and overriding the prohibition of the execution of the secondary fuel injection until a prescribed period has elapsed after the indication that the engine oil needs to be changed.

\* \* \* \* \*